(12) United States Patent
Liu

(10) Patent No.: US 6,260,907 B1
(45) Date of Patent: Jul. 17, 2001

(54) ACCESS OPENING STRUCTURE FOR A VEHICLE

(76) Inventor: Yu-An Liu, 34, Alley 31, Lane 647, Sec. 6 Chung-Hua Rd., Hsinchu (TW)

( * ) Notice: Subject to any disclaimer, the term of this patent is extended or adjusted under 35 U.S.C. 154(b) by 0 days.

(21) Appl. No.: 09/468,773

(22) Filed: Dec. 21, 1999

(30) Foreign Application Priority Data

Dec. 24, 1998 (TW) ................................................ 87221595

(51) Int. Cl.7 ........................................................ B60J 5/06
(52) U.S. Cl. ........................... 296/155; 296/181; 296/183
(58) Field of Search .................................... 296/181, 183, 296/155, 202, 146.8, 36, 146.13; 105/378, 379

(56) References Cited

U.S. PATENT DOCUMENTS

| | | | |
|---|---|---|---|
| 3,997,123 | 12/1976 | Clay, Jr. et al. | ............... 49/102 |
| 4,688,976 | * 8/1987 | Rowley et al. | ............ 296/181 X |
| 4,880,267 | 11/1989 | Ohya | ..................... 296/56 |
| 5,238,283 | * 8/1993 | Teigen | ............. 296/155 X |
| 5,997,072 | * 12/1999 | Parkinson | ........... 296/146.8 |
| 6,022,067 | * 2/2000 | Hargett et al. | ........... 296/183 |

* cited by examiner

*Primary Examiner*—D. Glenn Dayoan
*Assistant Examiner*—Lori L. Coletta
(74) *Attorney, Agent, or Firm*—Dougherty & Troxell

(57) ABSTRACT

A door structure for covering an access opening provided through a body member of a vehicle is disclosed. The door structure comprises a door panel, a pair of sliding means, and at least one supporting means. Each of the pair of sliding means includes a stationary track mounted on the body member along the side of the access opening, and a movable post mounted in said stationary track. The movable post is pivotally coupled with the top end portion of the door panel at its top end so that the bottom end of the door panel is adapted to swing out of the body member.

9 Claims, 10 Drawing Sheets

ACCESS OPENING STRUCTURE FOR A VEHICLE

BACKGROUND OF THE INVENTION

1. Field of the Invention

This invention relates to a door structure for a vehicle and more particularly to a door structure for a vehicle which is adapted to be opened upward by sliding and swinging as well as used as a large advertising plate or a sun-shade.

2. Description of the Prior Art

In a review of a modern vehicle, most of the doors of the vehicle are either opened by a horizontal sliding or an outward horizontal swing . However, in the case of swinging, a sufficient space is necessary or else access through the door is difficult. In the case of sliding, a sufficiently large area for access is not available. Moreover, most of the doors for vehicles are simply used as access for people or articles, rather than for other purposes.

In U.S. Pat. No. 4,880,267, a back door structure for a motor vehicle is disclosed, in which the back door is mounted on a vehicle roof with hinges for movement between an open and closed position. Moreover, a stay damper is connected with the back door at one end and connected with a rear pillar at the other end, which biases the back door to a raised open position and is disposed between the rear pillar and the back door when closed. However, such a door structure in that patent is still necessary for a sufficient swinging space.

In U.S. Pat. No. 3,977,123, an upwardly-acting door structure is disclosed, which comprises an upper panel and a lower panel moving at twice the speed of the former. The upper and lower panels may be raised to uncover an access opening, or lowered to cover the access opening. However, the door structure in U.S. Pat. No. 3,977,123 is not suitable for a space which has a height limitation preventing the door from being opened completely.

SUMMARY OF THE INVENTION

An object of this invention is to provide a door structure which can be opened in accommodation with the periphery space and thus can be opened with minor limitations.

Another object of this invention is to provide a door structure which can be used as a large advertising plate and a sun-shade or rain-shade and thus increase the utility of the door structure.

Yet another object of this invention is to provide a door structure which can be used to illuminate the periphery place as well as the advertising data on the door panel.

To achieve the above objects, a door structure according to this invention is mounted in a vehicle having a body member formed with an access opening and comprises: a door panel having a top end, a bottom end opposite to the top end, and two opposite side ends to comply with the lateral and longitudinal sides of the access opening to securely cover the access opening, the door panel having at least one longitudinal guiding slot formed on at least one of the side ends thereof; a pair of sliding means, each having a stationary track mounted onto the body member along the longitudinal side of the access opening, and a movable post slidably mounted in the stationary track; each of the movable posts having a top end which pivots on an upper portion of the side end of the door panel; and at least one retractable supporting means each having a fixed end and a telescopic end, the fixed end being pivoted on the body member and the telescopic end being able to slide along the guiding slot.

By means of the above door structure, the door panel could be opened by an upward sliding or/and an outward swing in accommodation with the peripheral environment and thus any limitation for opening is minimized.

By means of the above door structure, the door panel could be slid upward by the sliding means to the top, so as to serve as an advertising plate in a highly visible way. Moreover, the bottom end of the door panel could be pulled outward and upward substantially around the top end of the door panel to a horizontal position so as to serve as a sun-shade or rain-shade.

In accordance with a further embodiment, the door structure further comprises an illuminating device installed between a space formed between an outer surface plate and an inner surface plate in the door panel. At least one of the surface plates is transparent. Thus, either the advertising data is presented on the outer surface plate, or the space under the door panel of a horizontal position could be illuminated.

The advantages and features of this invention can be easily comprehended by persons skilled in the art through the drawings and detailed explanations.

DETAILED DESCRIPTIONS OF EMBODIMENTS

Figure 1:
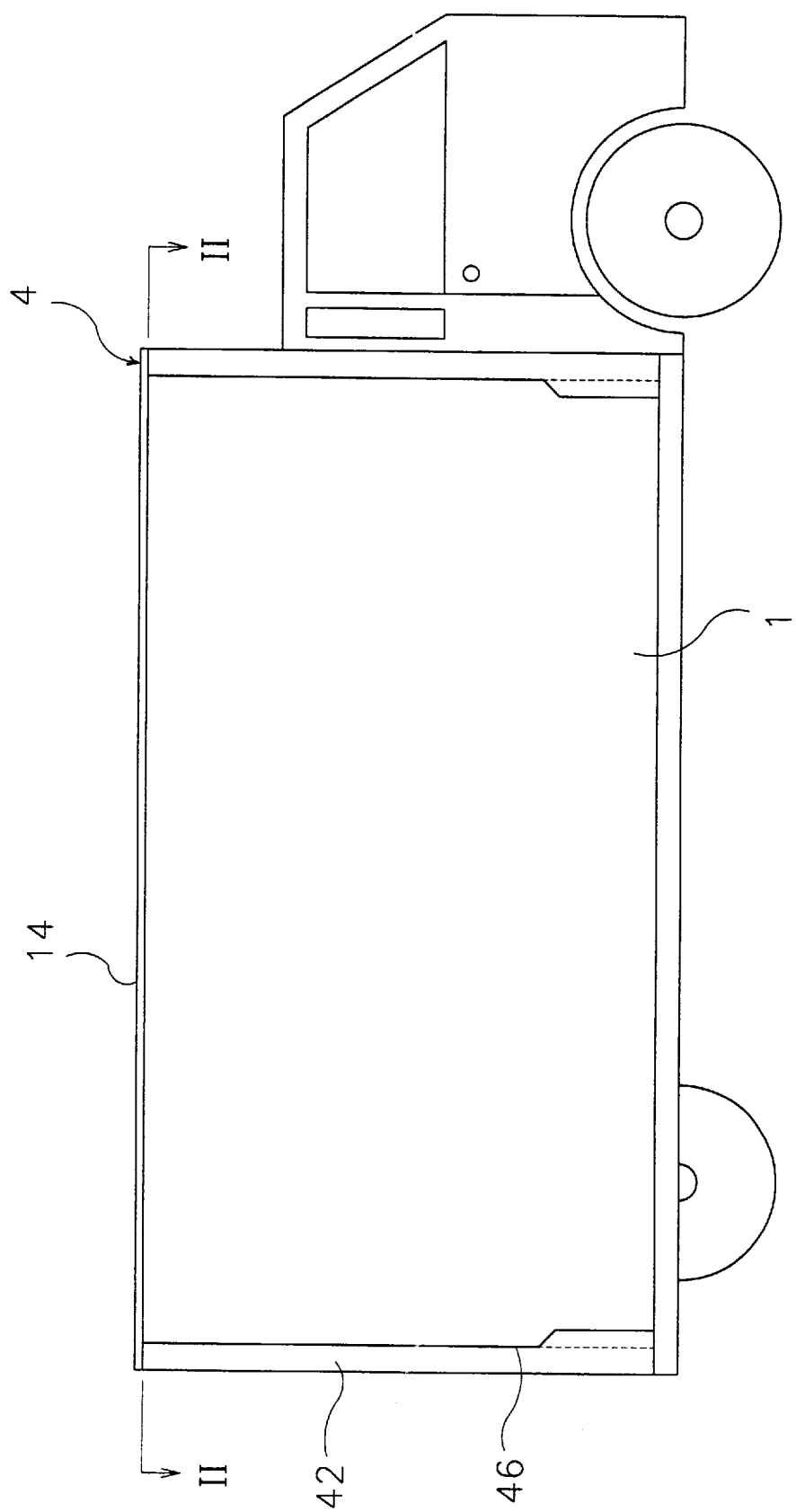
FIG. 1 illustrates a schematic side view of a truck which is incorporated with a door structure according to this invention, being at a closed position.

FIG. 1 illustrates a schematic side view of a truck in which a door structure (broadly, "access opening structure") according to this invention is incorporated. However, though a side door is illustrated in FIG. 1, the door structure of this invention could also be applied to a back door.

Figure 2:
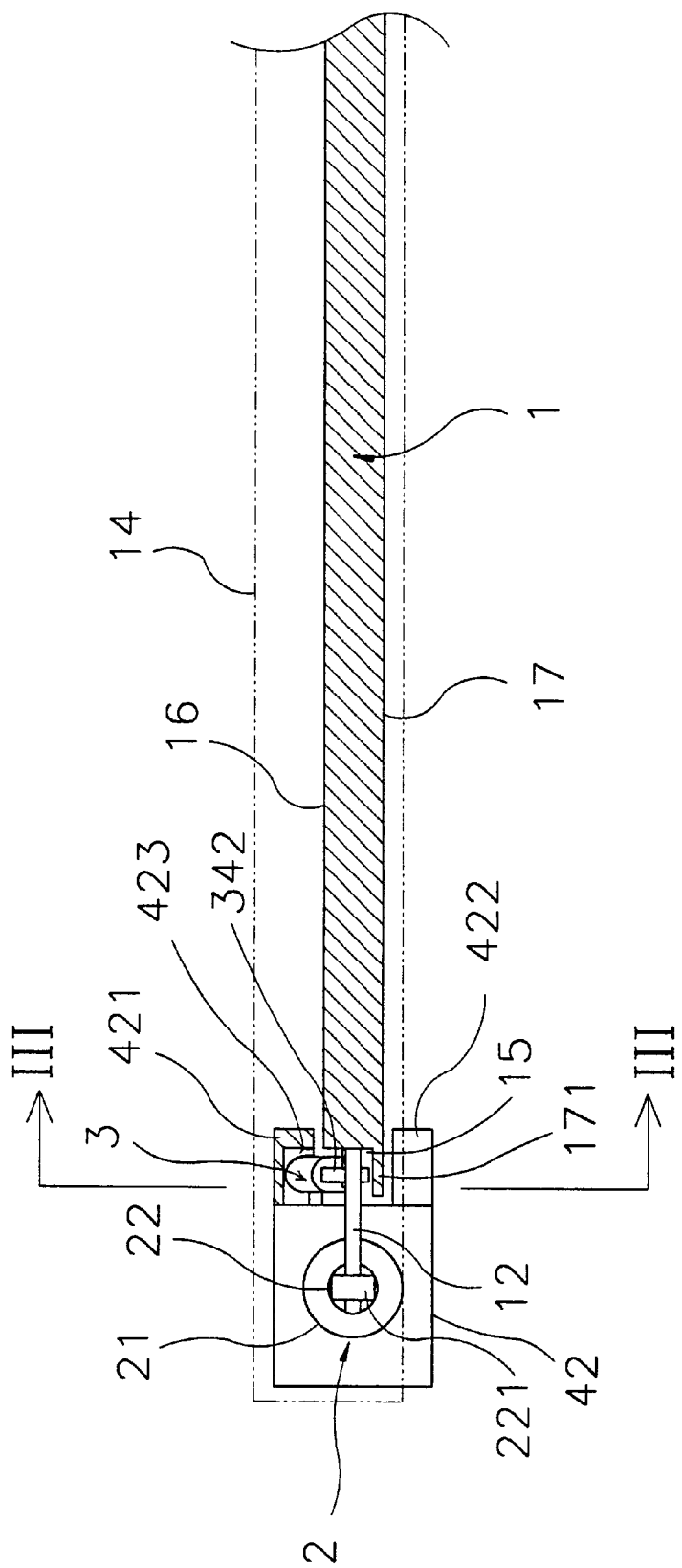
FIG. 2 illustrates a fragmentally schematic top view of the door structure in accordance with a first embodiment of this invention taken along line II—II of FIG. 1.
Figure 3:
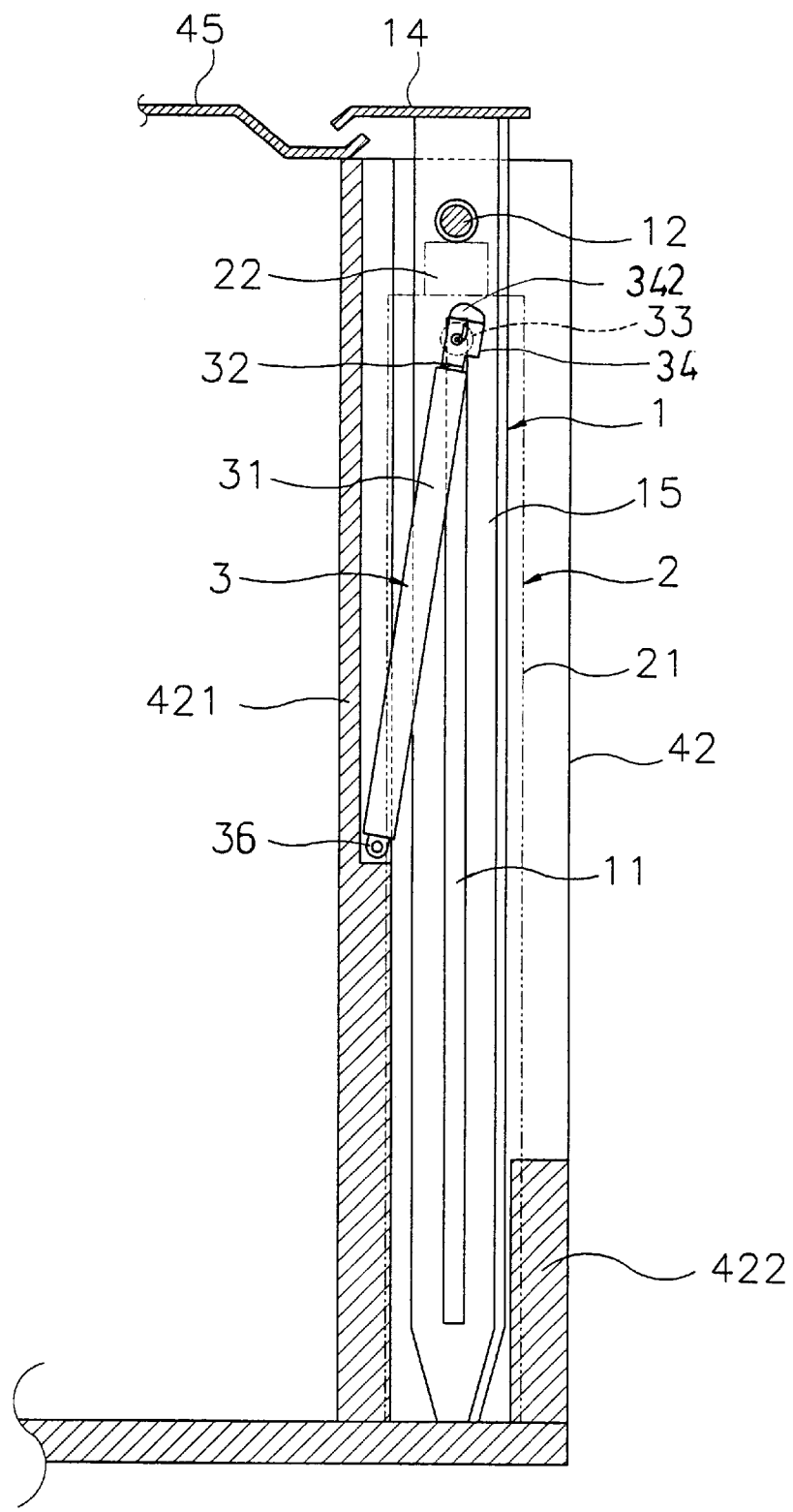
FIG. 3 illustrates a schematic end view of the door structure of this invention taken along line III—III of FIG. 2.

As shown in FIGS. 1, 2, and 3, the truck includes a body member 4 mainly consisting of a roof plate 45, a deck plate 44, and pillars 42 located at four corners. Moreover, an access opening 46 (indicated in FIG. 4) is formed between two pillars 42 and has a substantially rectangular shape defined by two opposite lateral sides and two opposite longitudinal sides. The door structure, according to this invention, mainly comprises a door panel 1 (broadly, "access opening panel"), a pair of sliding means 2, and two retractable supporting means 3.

The door panel 1 has a top end, a bottom end opposite to the top end, two opposite side ends 15, an inner surface plate 16, and an outer surface plate 17. The size of the door panel 1 complies with the lateral and the longitudinal sides of the access opening 46 so as to securely cover the access opening 46. The bottom end of the door panel 1 is thinned to a wedge-like shape. Moreover, the door panel 1 is formed at the side end 15 with two longitudinal guiding slots 11 each extending substantially from the top end to the bottom end, and is provided with two pins 12 each extending from the side end 15 at a position above the guiding slot 11, a water-resistant plate 14 on the top end for serving as a rain-shade, and two flanges 171 each extending from the top end to the bottom end at one side end of the outer surface plate 17.

Each of the pair of sliding means 2 includes a stationary cylinder 21, serving as a stationary track, and a movable post 22, movable along the cylinder 21. The stationary cylinder 21 is mounted in the pillar 42 along the access opening 46. The movable post 22 is provided with a bearing collar 221 at its top end for pivotally supporting the pin 12 provided on the door panel 1. The movable post 22 can be pushed out and retracted by a hydraulic mechanism via an introduction of oil into/out of the cylinder 21. Since the hydraulic mechanism is well know by persons skilled in the art, its description is omitted.

The retractable supporting means 3 includes a movable cylinder 31 and a rod member 32, which could be either a stay damper as disclosed in the above U.S. Pat. No. 4,880,267, or a hydraulic lifter actuated by a hydraulic mechanism. The movable cylinder 31 is pivotally mounted on the substantially middle portion of the pillar 42 at one fixed end via a collar 36. The rod member 32 is slidably accommodated in the cylinder 31, and a telescopic end of which is provided with a connecting plate 34 and a roller 33 slidably received in the guiding slot 11, so as to slide along the guiding slot 11. As shown in an enlarged view in FIGS. 6 and 7, the connecting plate 34 is formed with a curved slot 341 for receiving a shaft of the roller 33. The curved slot 341 is defined by an inner curved edge 343 and an outer curved edge opposite to the inner curved edge 343, and has an inner end 344 and an outer end 345. The tail end of the connecting plate 34 is preferably installed with a rubber pad 342, used as a paw, for engaging with the inner surface of the flange 171 in case the shaft of the roller 33 is moved to the inner end 344 of the curved slot 341, i.e., a fixed position. The inner curved edge 343 functions as a detent to fix the shaft of the roller 33 in case the shaft is moved into the fixed position. However, the rubber pad 342 will be away from the inner surface of the flange 171 in case the shaft of the roller 33 is moved into the outer end 345 of the curved slot 341, i.e., a free position. Besides, for facilitating the fixation between the door panel 1 and the supporting means 3, a plurality of bevel teeth (not shown) could be discretely provided on the inner surface of the flange 171.

The surface of the pillar 42 which faces the door panel 1 is provided with an inner flange 421 extending along the whole height of the door panel for engaging with the door panel 1, and an outer flange 422 extending along a lower portion of the door panel 1 for managing the closed position of the door panel 1. In the inner flange 421, a slot 423 is formed for accommodating the retractable supporting means 3.

In the following, an operation with respect to the door structure arranged as above is described.

Figure 4:
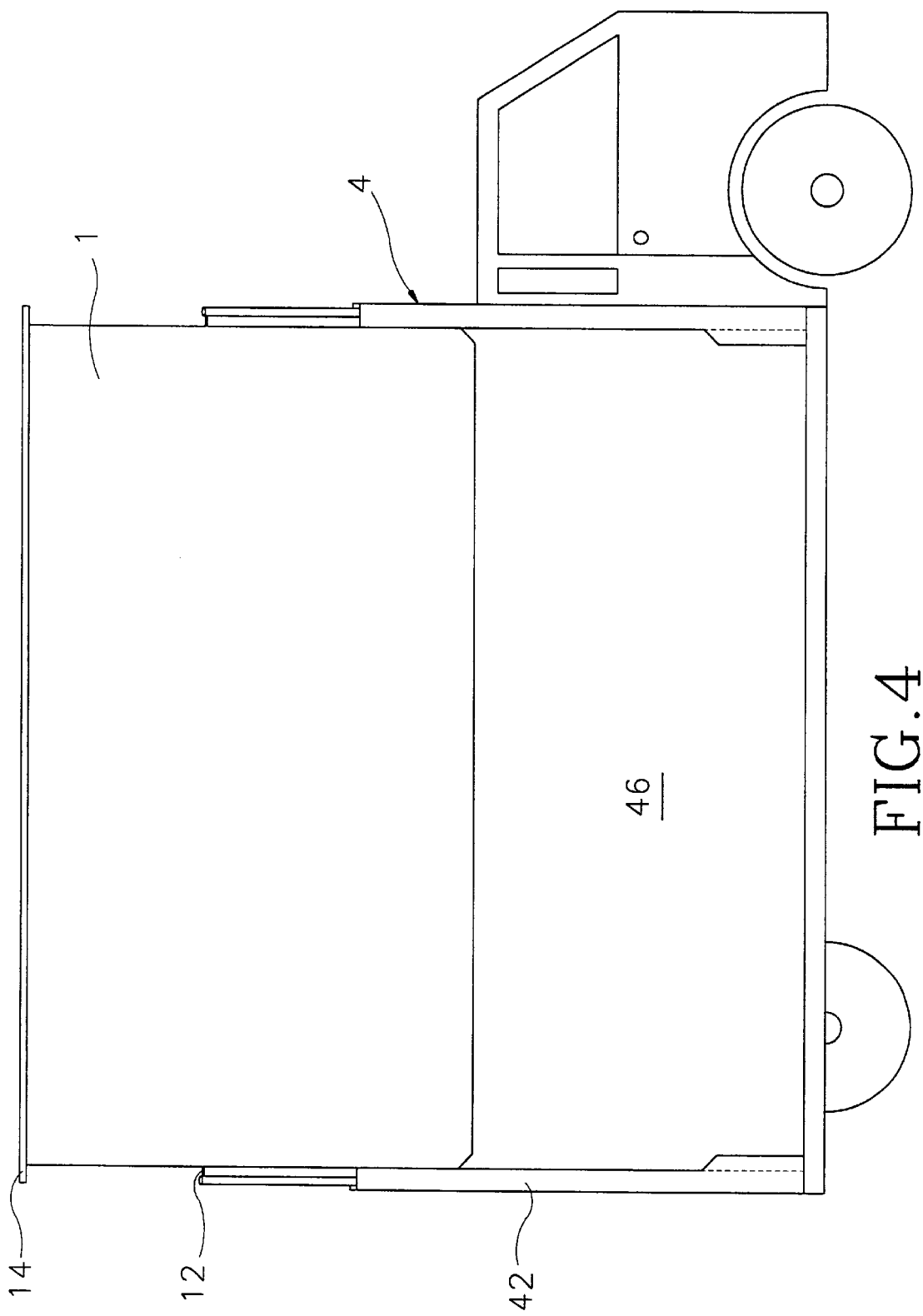
FIG. 4 shows a schematic side view of a truck which is incorporated with a door structure according to this invention, being at an open position.
Figure 5:
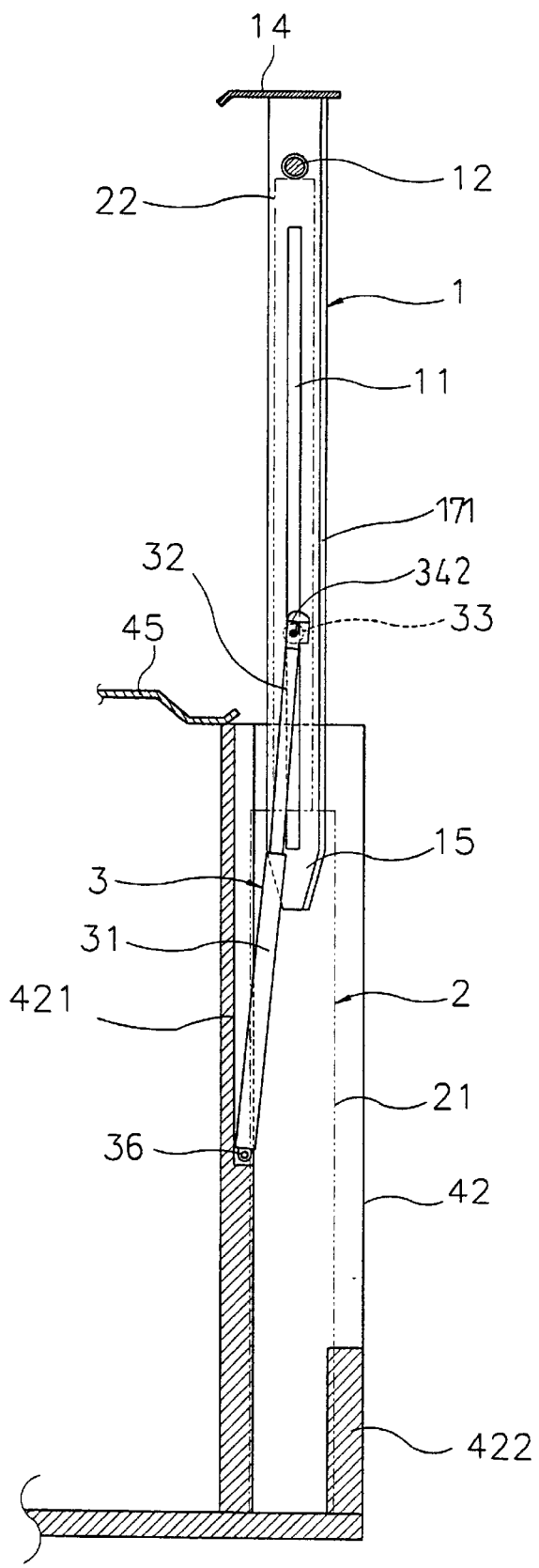
FIG. 5 shows a view like FIG. 3 with the door panel being in a vertical open position.

As shown in FIGS. 4 and 5, the door panel 1 is slid upward to a vertical open position. It is especially suitable for a place lacking a sufficient swing space for the opening of the door panel 1. As shown in FIG. 5, to achieve such an open position, the movable post 22 is actuated upward along the stationary cylinder 21 by the hydraulic mechanism. In line with the movement of the post 22, the rod 32 extends upward while the roller 33 slides in the slot 11 until the arrival of the post and the door panel 1 at its upmost position. As well, in case the supporting means 3 is constructed with a stay damper and the stay damper can provide proper, sufficient pushing power, especially for a small car, the door panel 1 could be designed to be opened manually after releasing the door lock (not shown) of the door panel 1, and thus the hydraulic mechanism is omissible. In the vertical open position, an advertising effect is also available on the outer surface plate of the door panel 1.

Figure 6:
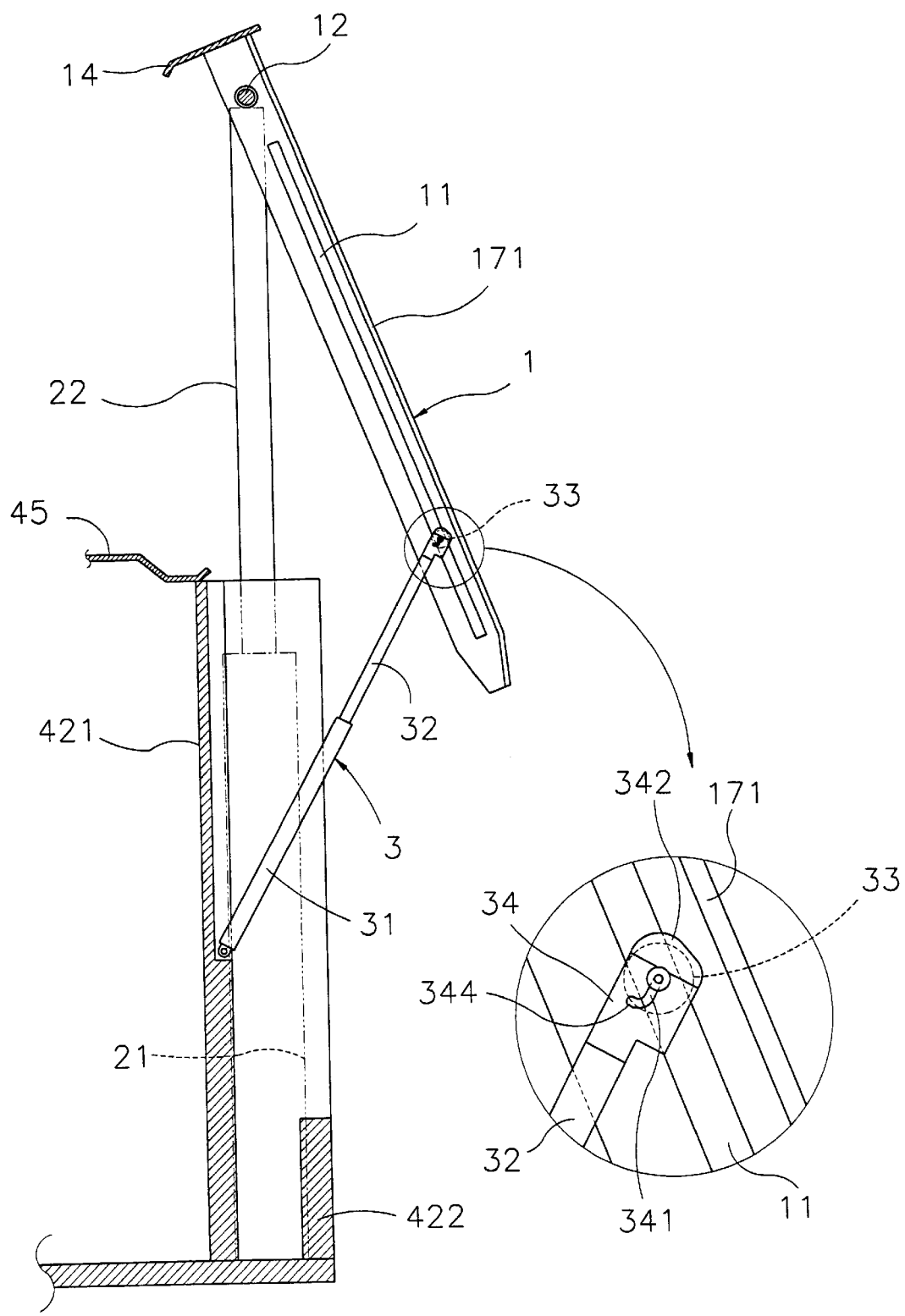
FIG. 6 shows a view like FIG. 3 with the door panel being in an inclined position in which the bottom end thereof is slightly away from the body frame and the shaft of the roller is located at a free position.
Figure 7:
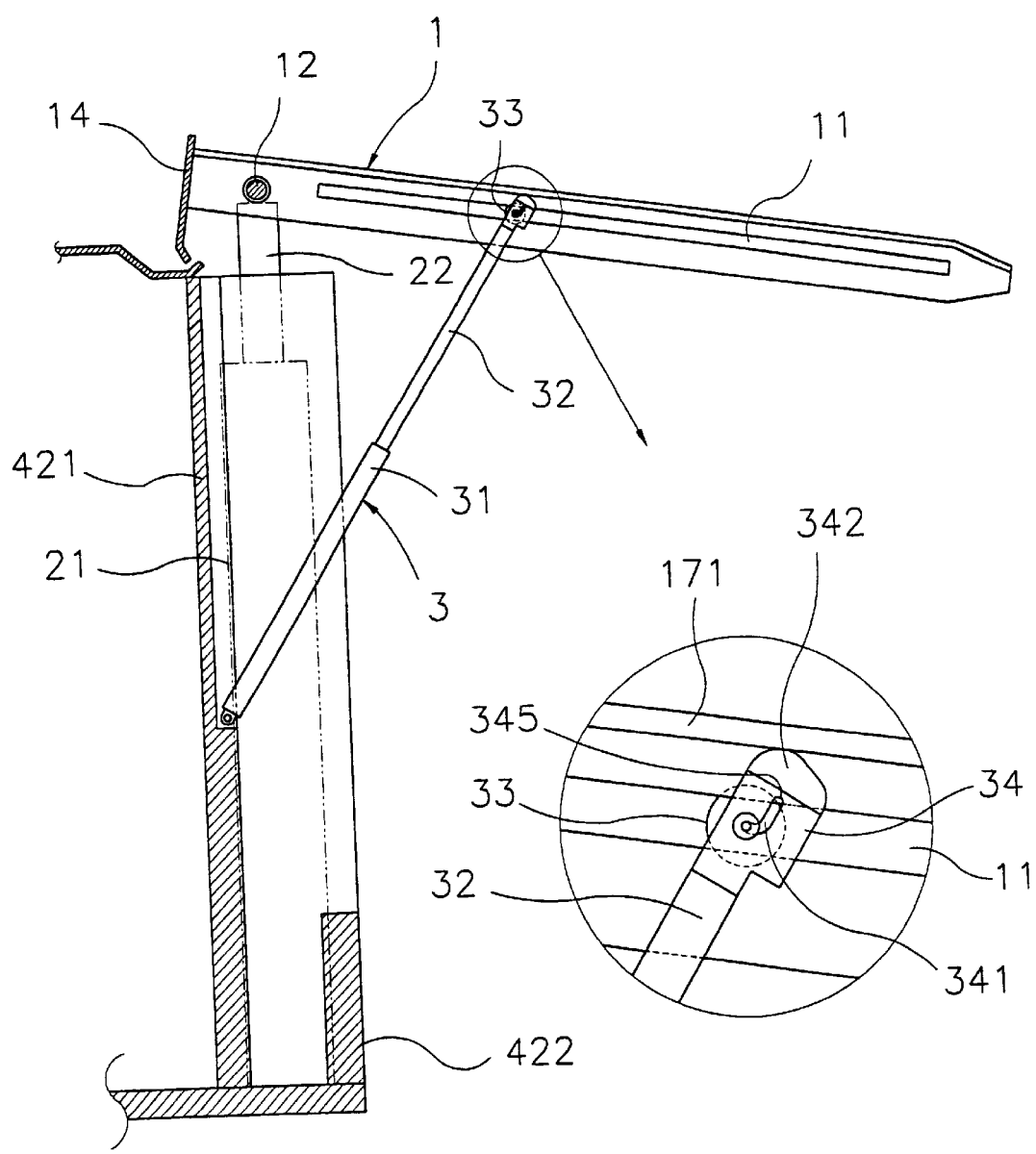
FIG. 7 shows a view like FIG. 3 with the door panel being in a substantially horizontal position in which the movable post is in a substantially retracted position, the supporting means is in the maximally extended position, and the shaft of the roller is located at a fixed position.

As shown in FIGS. 6 and 7, the door panel 1 can be further changed to an inclined position or a substantially horizontal position so as to serve as a sunshade or rain-shade. For an inclined position, it can be achieved by pulling the bottom end of the door panel 1 out of the body frame 4 so as to swing the door panel 1 around the pin 12 until the roller 33 moves near to the bottom end of the guiding slot 11. Once the desired position or angle is arrived at, the relative position between the door panel 1 and the supporting means 3 could be fixed by holding on to the supporting means 3 while simultaneously pushing down the bottom end of the door panel 1 so as to make the shaft of the roller 33 move into the inner end 344 of the curved slot 341, as shown in FIG. 7. Thus, the rubber pad 342 at the tail end of the connecting plate 34 will engage with the flange 171 so as to make the door panel 1 obliquely supported. Oppositely, if the relative position between the door panel 1 and the supporting means 3 is to be released, it can be achieved by holding on to the door panel 1 and simultaneously pushing the supporting means 3 so as to make the shaft of the roller 33 slide into the outer end 345 of the curved slot 341. 34.

Otherwise, for a horizontal position, the post 22 can be retracted into the cylinder 21 to a position as shown in FIG. 7 after the door panel 1 is swung out of the body member 4. Thus, the roller 33 of the supporting means 3 will slide to and support against a middle position of the slot 11. At such a position, the relative position between the door panel 1 and the supporting means 3 could be fixed in the manner mentioned above.

Moreover, although it is not shown in the drawings, one could understand that the door panel 1 can also be opened by sliding up in the first stage until the bottom end thereof escapes from the top end of the outer flange 422 and then by swinging up in the second stage until the door panel 1 is located in a horizontal position. Such an opening method is especially suitable for a case when opening the door panel 1 has a height limitation.

Figure 8:
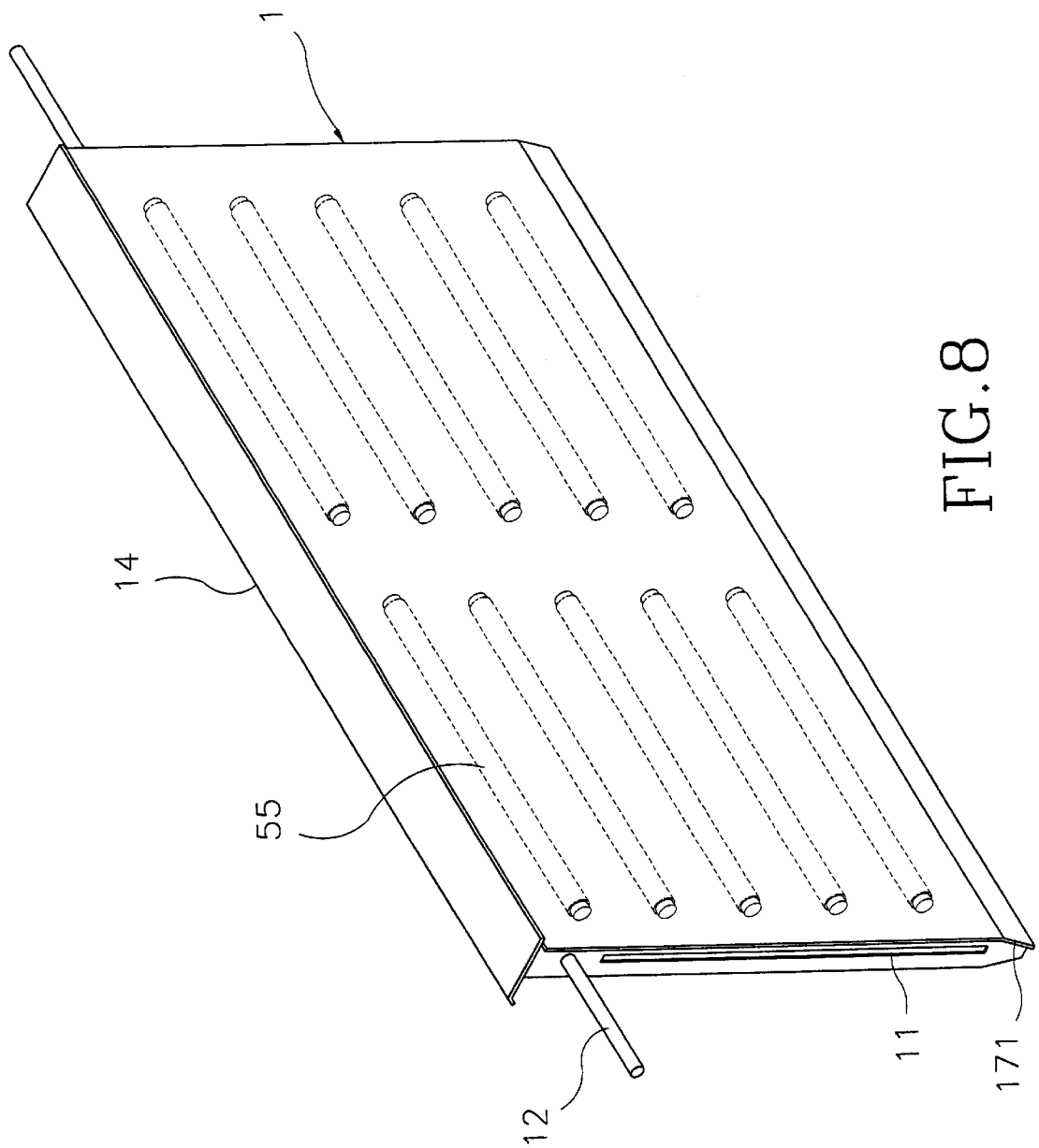
FIG. 8 shows a schematic perspective view of the door panel of this invention which depicts—by dotted line—an illuminating device installed in the space between the inner surface plate and the outer surface of the door panel.

FIG. 8 shows a modification of the door panel 1 in which the outer surface plate 17 is transparent and the space between the inner surface plate 16 and the outer surface plate 17 is provided with a plurality of illuminating devices 55 such as fluorescent lamps. In such a case, an advertising effect could be available even at night. Otherwise, the inner surface plate 16 could be transparent so that the door panel 1 could be used to illuminate the space under the door panel 1 when the door panel 1 is opened to a horizontal position.

Figure 9:
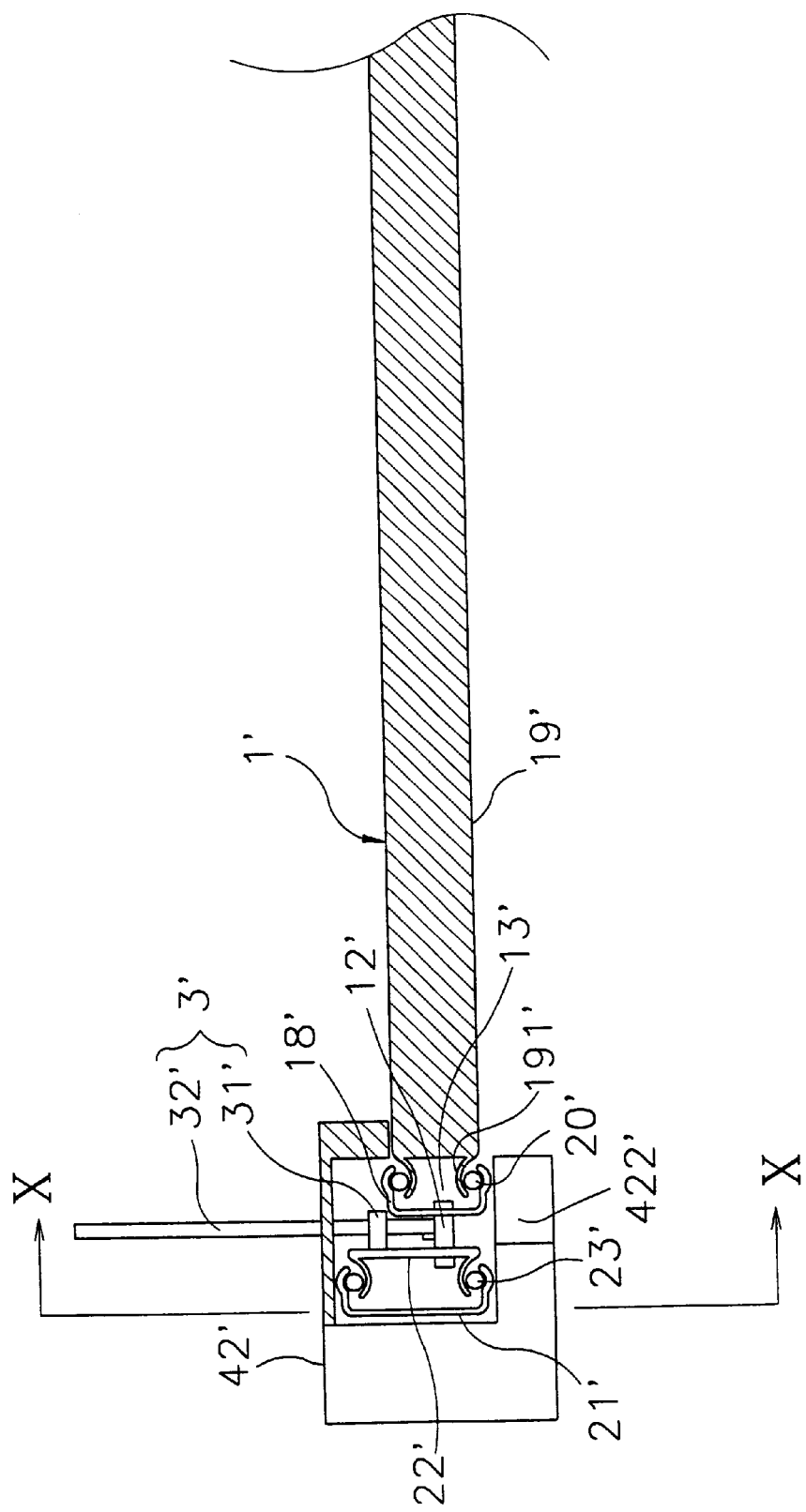
FIG. 9 illustrates a fragmentally schematic top view of the door structure in accordance with a second embodiment of this invention taken along line II—II of FIG. 1.

FIG. 9 illustrates a fragmentally schematic top view of the door structure in accordance with a second embodiment of this invention taken along line II—II of FIG. 1. The second embodiment of this invention is substantially the same as the first embodiment except for the structures of the door panel and the sliding means. For ease of recognition, the components corresponding to those in the first embodiment are indicated with the same numerals followed with a prime note.

As shown in FIG. 9, the pillar 42' is substantially the same as that presented in the first embodiment, which is also provided with an inner flange 421'and a shorter outer flange 422'. Each of the sliding means 2' is constructed by a U-shaped stationary track 21', and a movable track 22' of a correspondingly smaller U shape. The stationary track 21' is fixed on the pillar 42' by any proper manner. The movable track 22', functioning as the movable post in the first embodiment, is received in the opening of the stationary track 21' via a plurality of ball bearings 23' aligned by a seat (no numeral indicated).

The door panel 1' in this embodiment includes a pair of frame tracks 18' and an inner door panel 19'. Two side edges of the inner door panel 19' are constructed with a pair of inner tracks 191', respectively. Each of the frame tracks 18' is formed with a slot 13' for receiving one of the inner tracks 191' of the inner door panel 19' so as to permit the sliding of the inner track 191' along the frame track 18', via a plurality of ball bearings 20' aligned by a seat (no numeral indicated). The top end of the frame track 18' is pivotally mounted, with a spacing, to the top end of the movable track 22' by a rivet pin 12'.

A supporting means 3' is provided between the frame track 18' and the movable track 22' and comprises an arc lath 31' and a positioning member 32'. The positioning member 32' is mounted on the movable track 22' and includes a ball (not shown) for contacting the arc lath 31' and a biasing spring (not shown) for biasing the ball toward the arc lath 31'. The arc lath 31' is formed with a plurality of holes 35' along its length, and is fixed on the frame track 18' at one end while another end thereof penetrates through the positioning member 32' such that one of the holes 35' is engaged by the ball of the positioning member 3' so as to fix the arc lath in position.

Figure 10:
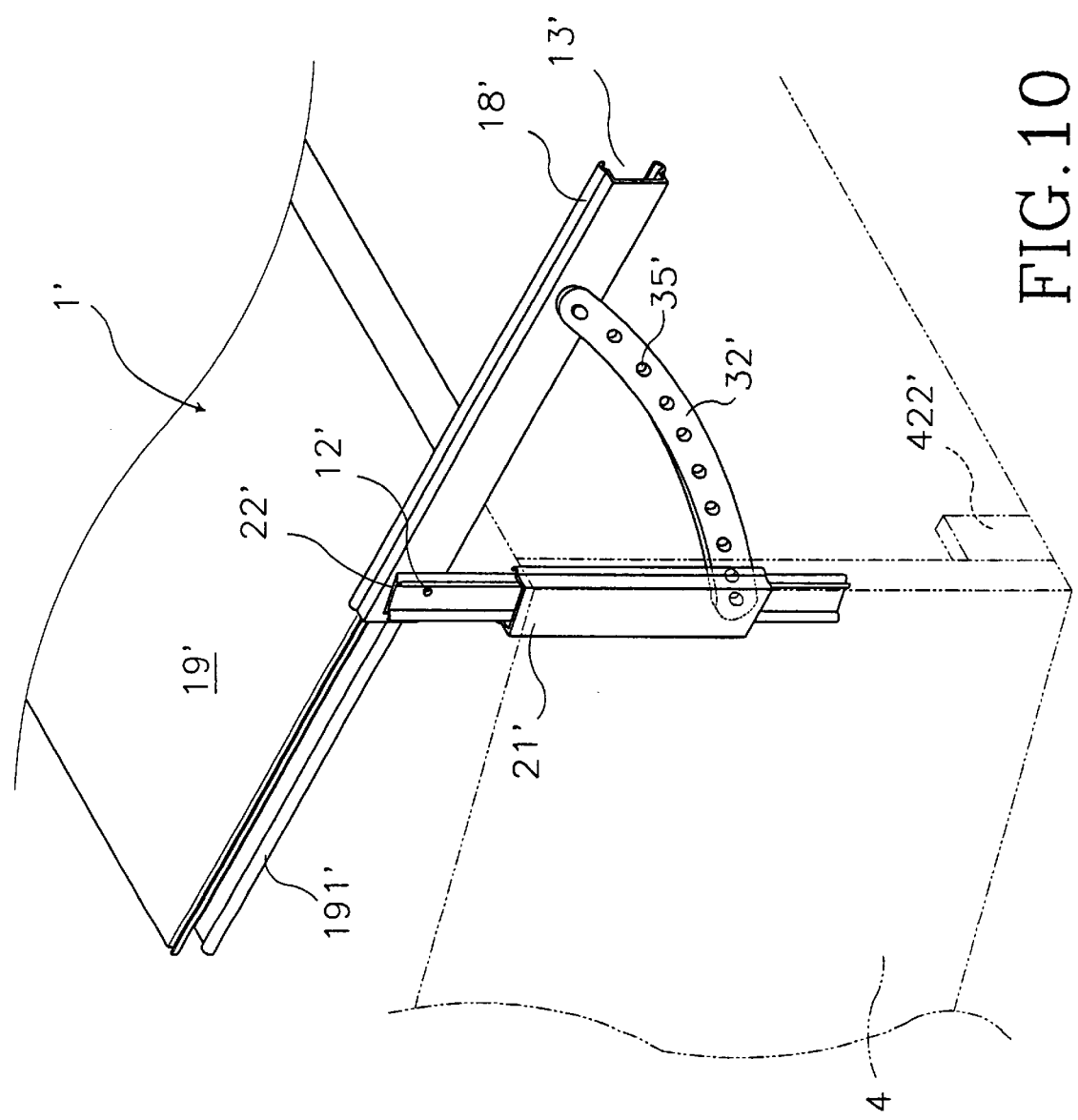
FIG. 10 shows a schematic perspective view taken along line X—X of FIG. 9 with the inner door panel being in a substantially horizontal position while sliding out of the frame track.

By means of the second embodiment of this invention, in addition to the effects and opening functions illustrated in the first embodiment, the inner door panel 19' can be further removed to a position as shown in FIG. 10 after the door panel 1' has been opened to a horizontal position. As for the operating manner, it is almost the same as the first embodiment and thus its description is omitted herein. This embodiment is especially suitable for a circumstance having a height limitation for the opening of the door panel 1 and a spatial requirement that the upper space outside the body member 4 should not be covered by the door panel 1', such as when using a forklift. In this case, moreover, the vertical sliding-up of the door panel 19' can be achieved by first sliding the movable track 22' up a little distance and then secondly sliding the inner door panel, with respect to the frame track 18', up a larger distance.

In addition to the above, a proper fixation/position means can be provided between the frame track 18' and the inner door panel 19' so as to fix the position of the inner door panel 1' relative to the frame track 18', as well as between the stationary track 21' and movable track 22' so as to fix the position of the movable track 22'. For example, a ratchet and paw mechanism (not shown) can be provided in the inner door panel side, while a rack can be provided in the frame track side, such as in the slot 13'. Moreover, the supporting means 3' could be constructed by any proper means such as a folding slat, in addition to the arc lath or stay damper mentioned above.

From the embodiments of this invention thus described, it will be obvious that the present invention may be varied in many ways. Such variations are not to be regarded as a departure from the spirit and scope of the invention, and all such modifications as would be obvious to one skilled in the art are intended for inclusion within the scope of the following claims:

What is claimed is:

1. An access opening structure for a vehicle wherein an access opening has a generally rectangular shape defined by two opposite lateral sides and two opposite longitudinal sides, the access opening structure comprising:

an access opening panel having a top end, a bottom end opposite to the top end, and two opposite side ends to comply with the lateral and longitudinal sides of the access opening to securely cover the access opening, a pair of sliders, each having a stationary track adapted for mounting onto the vehicle along the longitudinal side of the access opening, and a movable post slidably mounted in the stationary track; each of the movable posts having a top end which pivotally supports an upper portion of the access opening panel so that the bottom end of the access opening panel can swing apart from the vehicle into an inclined position; and at least one support for supporting the access opening panel in the inclined position with respect to the sliders.

2. An access opening structure as set forth in claim 1, wherein the access opening panel is provided with at least one longitudinal guide formed on one of the side ends thereof, and wherein the support has a fixed end and a telescopic end, the fixed end being adapted for pivoting on the vehicle and the telescopic end being able to slide along the guide and support the bottom end of the access opening panel apart from the access opening.

3. An access opening structure as set forth in claim 2, wherein the guide is in the form of a slot, and wherein the telescopic end of the support is provided with a connecting plate having a tail end, and a roller slidably received in the slot, the connecting plate being formed with a curved slot for receiving a shaft of the roller such that the relative position between the access opening panel and the support can be fixed by means of the engagement of the tail end of the connecting plate with the access opening panel.

4. An access opening structure as set forth in claim 1, wherein the support is in the form of an arc lath, which has one end portion fixed on the access opening panel and another portion adjustably fixed on the movable post.

5. An access opening structure as set forth in claim 1, wherein the stationary track is in the form of a cylinder which accommodates the movable post therein, and wherein the access opening structure further comprising a hydraulic mechanism which actuates and controls the moveable post moving upward and downward.

6. An access opening structure as set forth in claim 1, wherein the access opening panel has an outer surface plate and an inner surface plate, both of them defining a space therebetween and at least one of the two surface plates being partly transparent, and wherein the access opening structure further comprises an illuminating device installed in the space.

7. An access opening structure as set forth in claim 1, wherein the access opening panel further includes a water-resistant plate provided on the top end thereof.

8. An access opening structure as set forth in claim 1, wherein the access opening panel further includes an inner access opening panel having two opposite sides, and a pair of frame tracks respectively disposed on the opposite sides of the inner access opening panel such that the inner access opening panel is adapted to slide between the pair of frame tracks, in which each of the frame tracks has a top end portion being pivotally mounted on the top end of the movable post.

9. A vehicle comprising an access opening having a generally rectangular shape defined by two opposite lateral sides and two opposite longitudinal sides and an access opening structure, the access opening structure comprising:

an access opening panel having a top end, a bottom end opposite to the top end, and two opposite side ends to comply with the lateral and longitudinal sides of the access opening to securely cover the access opening, a pair of sliders, each having a stationary track adapted for mounting onto the vehicle along the longitudinal side of the access opening, and a movable post slidably mounted in the stationary track; each of the movable posts having a top end which pivotally supports an upper portion of the access opening panel so that the bottom end of the access opening panel can swing apart from the vehicle into an inclined position; and at least one support for supporting the access opening panel in the inclined position with respect to the sliders.

\* \* \* \* \*